(12) United States Patent
Kim et al.

(10) Patent No.: US 7,720,280 B2
(45) Date of Patent: May 18, 2010

(54) COLOR CORRECTION APPARATUS AND METHOD

(75) Inventors: Sung-su Kim, Yongin-si (KR); Du-sik Park, Suwon-si (KR); Chang-yeong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 11/591,598

(22) Filed: Nov. 2, 2006

(65) Prior Publication Data

US 2007/0139739 A1    Jun. 21, 2007

(30) Foreign Application Priority Data

Dec. 19, 2005    (KR) ............... 10-2005-0125817

(51) Int. Cl.
*G06K 9/00*    (2006.01)
(52) U.S. Cl. ........................ 382/167; 382/162
(58) Field of Classification Search ............ None
See application file for complete search history.

(56) References Cited

U.S. PATENT DOCUMENTS

| 5,321,797 | A | 6/1994 | Morton |
| 6,476,877 | B2 | 11/2002 | Kihara et al. |
| 7,046,402 | B2 * | 5/2006 | Watanabe ............ 358/514 |
| 7,085,009 | B2 * | 8/2006 | Kawai et al. ............ 358/1.9 |
| 7,620,239 | B2 * | 11/2009 | Minamino ............ 382/165 |
| 2004/0013296 | A1 | 1/2004 | Aotsuka |

FOREIGN PATENT DOCUMENTS

| JP | 05-244406 A | 9/1993 |
| JP | 6-78320 A | 3/1994 |
| JP | 08-018809 A | 1/1996 |
| JP | 2003-331275 A | 11/2003 |
| KR | 2003-0066992 A | 8/2003 |
| KR | 10-0408508 B1 | 11/2003 |
| KR | 10-2005-0106672 A | 11/2005 |

* cited by examiner

*Primary Examiner*—Anh Hong Do
(74) *Attorney, Agent, or Firm*—Sughrue Mion, PLLC (57) ABSTRACT

A color correction apparatus and method are provided. The color correction apparatus includes: a chromatic region determination module determining a first chromatic region to which an input pixel constituting an input image belongs and a second chromatic region neighboring the first chromatic region on a basis of specified chromatic region division information; a polynomial regression operation module performing polynomial regression on the first chromatic region and the second chromatic region; and a blending module providing corrected pixel information for the input pixel by giving weight values to results of the polynomial regression on the first chromatic region and the second chromatic region. The color correction method includes: determining the first and second chromatic regions; performing polynomial regression on the first and second chromatic regions; and providing corrected pixel information for the input pixel by giving weight values to results of the polynomial regression on the first and second chromatic regions.

21 Claims, 12 Drawing Sheets

COLOR CORRECTION APPARATUS AND METHOD

CROSS-REFERENCE TO RELATED APPLICATION

This application claims priority from Korean Patent Application No. 10-2005-0125817, filed on Dec. 19, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to color correction, and more particularly to performing color correction using chromatic region division and blending.

2. Description of the Related Art

Generally, a digital image sensor provided in an imaging apparatus such as a digital camera converts light energy reflected from an object into an electric signal form in order to display a taken image to a user.

However, in some cases, a color of an object that is actually seen by a user and a color of the object that is seen through an imaging apparatus may differ, and this difference cannot satisfy user's requirements.

In this case, a technique that corrects the color of an image collected by the imaging apparatus to a desired color is needed. This technique is generally called a "color correction" technique.

The color correction technique is to reproduce a color distorted due to individual color representation characteristics of an image collection and display device to match the characteristic of the device. U.S. Pat. No. 5,321,797 discloses a color correction method using a three-dimensional lookup table.

This color correction method is based on a reference color correction table, in consideration of three-dimensional color space information. This method has a superior color correction performance, but has a problem that many hardware resources are required. That is, this method is efficient for a system having sufficient hardware resources, but it is difficult for the method to be applied to a system that is relatively poor in hardware resources such as a portable digital camera.

In addition, U.S. Pat. No. 6,476,877 discloses a color correction method that divides a color space into plural regions and corrects colors using color correction coefficients considering characteristics in the divided color space regions. However, this method has a problem that contour artifacts may occur among the divided color space regions.

Accordingly, a color correction apparatus and method that is more efficient and can provide an improved performance has been required.

SUMMARY OF THE INVENTION

Exemplary embodiments of the present invention overcome the above disadvantages and other disadvantages not describe above. Also, the present invention is not required to overcome the disadvantages described above, and an exemplary embodiment of the present invention may not overcome any of the problems described above.

The present invention provides a color correction apparatus and method using a chromatic region division and blending.

The present invention also provides a color correction method that corrects color by performing a weighted blending method to obtain and apply weight values to resultant values of color correction of a corresponding chromatic region and a neighboring chromatic region on the basis of chromatic distances in consideration of pixel positions of an input image.

The present invention also provides a color correction method that improves color correction performance by minimizing contour artifacts.

According to an aspect of the present invention, there is provided a color correction apparatus which comprises a chromatic region determination module determining a first chromatic region to which an input pixel constituting an input image belongs and a second chromatic region neighboring the first chromatic region on a basis of specified chromatic region division information, a polynomial regression operation module performing polynomial regression on the first chromatic region and the second chromatic region, and a blending module providing corrected pixel information for the input pixel by giving weight values to results of the polynomial regression on the first chromatic region and the second chromatic region.

According to another aspect of the present invention, there is provided a color correction method which comprises determining a first chromatic region to which an input pixel constituting an input image belongs and a second chromatic region neighboring the first chromatic region on a basis of specified chromatic region division information, performing polynomial regression on the first chromatic region and the second chromatic region, and providing corrected pixel information for the input pixel by giving weight values to results of the polynomial regression on the first chromatic region and the second chromatic region.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects of the present invention will become more apparent by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail with reference to the accompanying drawings. The aspects of the present invention and methods for achieving the aspects will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the invention.

The present invention will be described herein with reference to the accompanying drawings illustrating block diagrams and flowcharts for explaining a color correction apparatus and method according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer-implemented process such that the instructions that are executed on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

Figure 1:
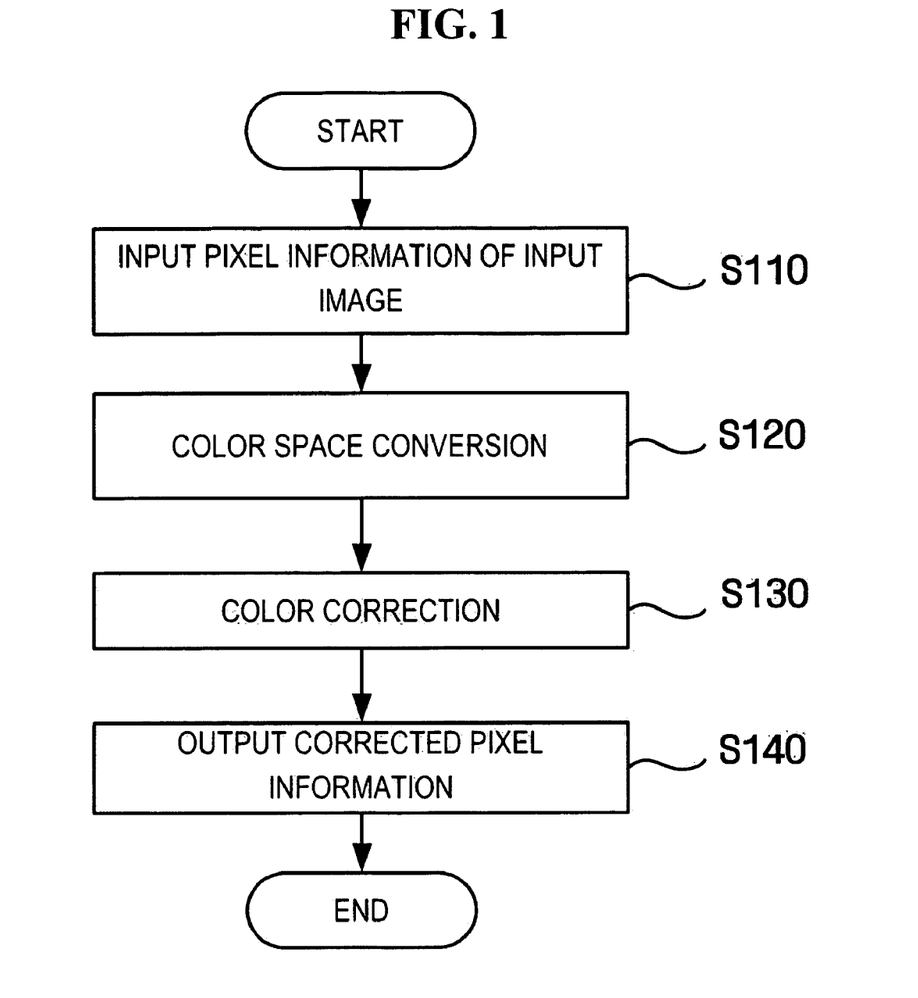
FIG. 1 is a flowchart illustrating a color conversion process according to an exemplary embodiment of the present invention.

FIG. 1 is a flowchart illustrating a color conversion process according to an exemplary embodiment of the present invention.

According to the color conversion process of FIG. 1, if an object is photographed using an imaging apparatus such as a digital camera, an image is inputted to an image sensor mounted on the digital camera and respective pixel information constituting the input image is inputted (S110). In this case, the pixel information may be inputted in the form of a one-dimensional lookup table and, for example, each respective pixel information may be represented by eight-bit data.

The input pixel information is converted into certain coordinates in a color space (S120). The term "color space" means a range of colors that can be reproduced. For example, an RGB color space reproduces a large portion of a visible spectrum by mixing, for example, red, green, and blue light, and the standard RGB ("sRGB") color space has been widely used as a common standard in monitors, printers, and digital cameras, although it has a lower reproduction capability than the visible spectrum. If the pixel information is converted into certain coordinates in a specified color space, a color correction is performed according to an exemplary embodiment of the present invention (S130), and the corrected pixel information is outputted (S140). The corrected pixel information may be outputted in the form of the one-dimensional lookup table.

Figure 2:
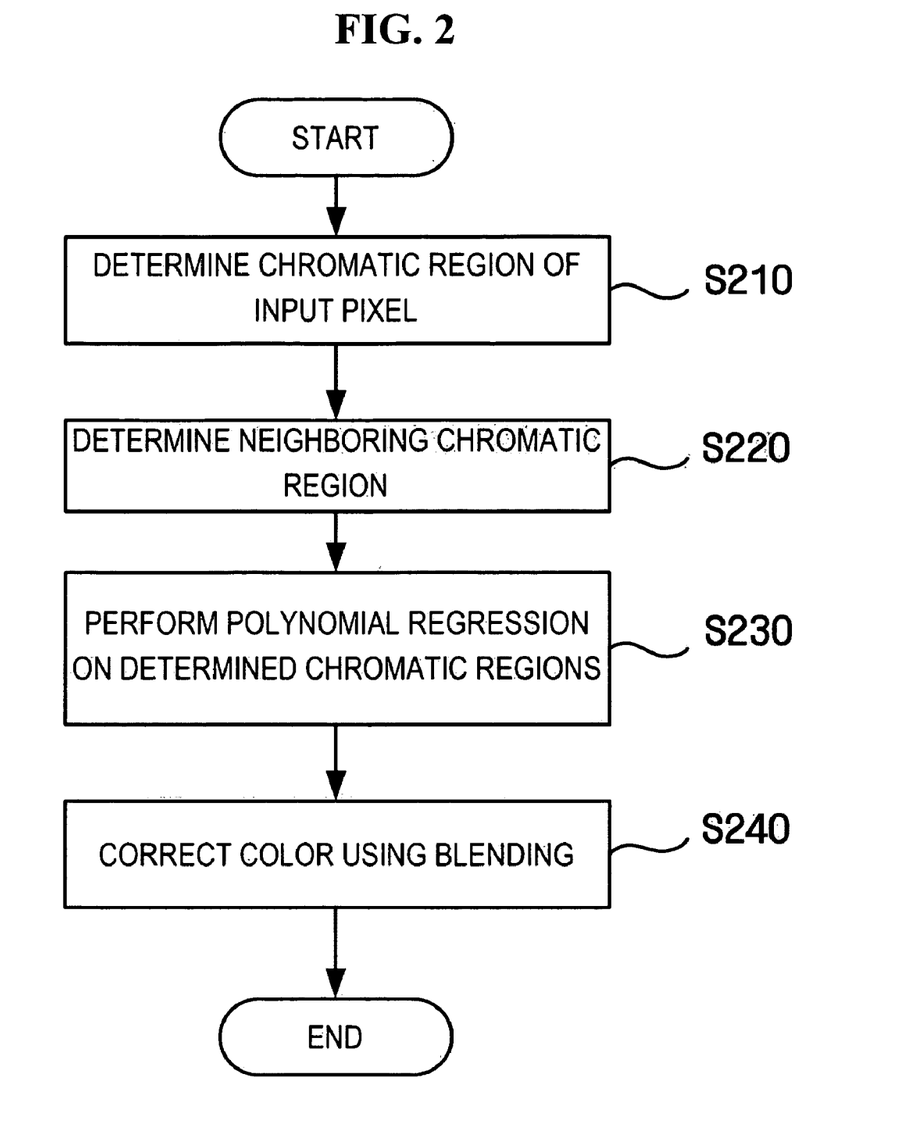
FIG. 2 is a flowchart illustrating a color correction method according to an exemplary embodiment of the present invention.

FIG. 2 is a flowchart illustrating a color correction method according to an exemplary embodiment of the present invention, in which operation S130 of FIG. 1 is illustrated in more detail.

According to the color correction method of FIG. 2, a chromatic region, to which input pixels converted into a color space belong, is determined using chromatic region division information (S210), and a neighboring chromatic region that is closest to the chromatic region is determined (S220).

A color sensed by eyes (e.g., color sensation or color stimulus) is determined by the calorimetric property of the color and the brightness (e.g., a stimulus value) of the color, wherein the property of the color in disregard of the brightness is called chromaticity, and a chromatic region means a region obtained by dividing the chromatic coordinates. In this case, the chromatic region division information represents information on how to divide the chromatic coordinates.

A method of determining the chromatic region will be explained in more detail with reference to FIGS. 3 to 5.

When a chromatic region to which the input pixels belong and its neighboring chromatic region are determined, a polynomial regression of the determined chromatic regions is performed (S230), and a color correction is accomplished by performing a blending process with respect to the result of the polynomial regression (S240). According to this blending process, the color correction is performed by reflecting all the characteristics of the chromatic region to which the input pixels belong and the neighboring chromatic region, in order to prevent the occurrence of an abrupt change of the color characteristics around a boundary between the chromatic region to which the input pixels belong and the neighboring chromatic region (i.e., contour artifacts). In this case, the blending process can be performed by giving a weight value to the result of the polynomial regression performed in operation S230 on the basis of a chromatic distance.

The polynomial regression and the blending process will be explained in more detail with reference to FIG. 6 and FIGS. 7 to 9, respectively.

Figure 3:
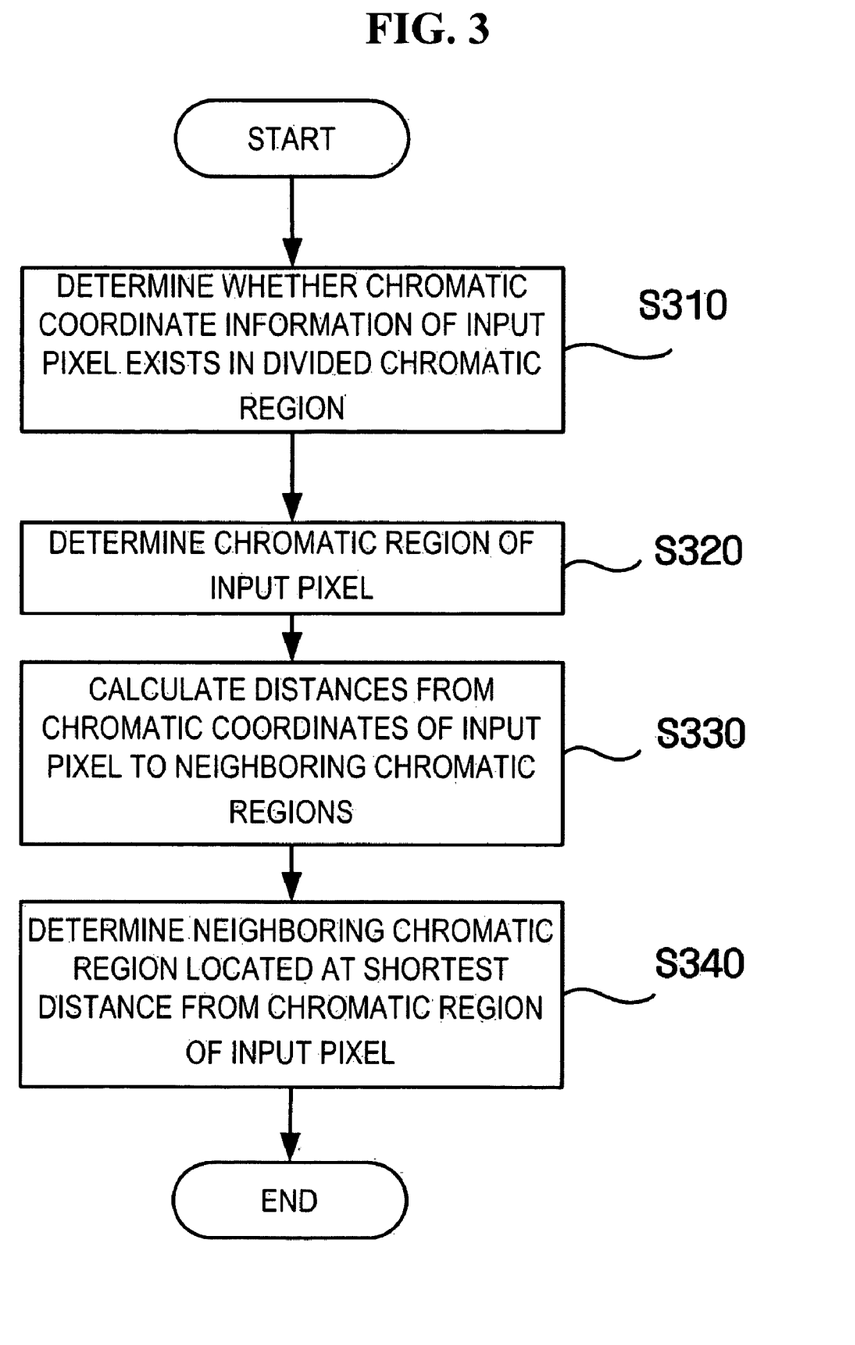
FIG. 3 is a flowchart illustrating a method of determining a chromatic region according to an exemplary embodiment of the present invention.

FIG. 3 is a flowchart illustrating a method of determining a chromatic region according to an exemplary embodiment of the present invention.

According to the method of FIG. 3, whether chromatic coordinate information of an input pixel exists in a divided chromatic region is checked based on chromatic region division information (S310), and then the chromatic region to which the input pixel belongs is determined (S320).

Figure 4:
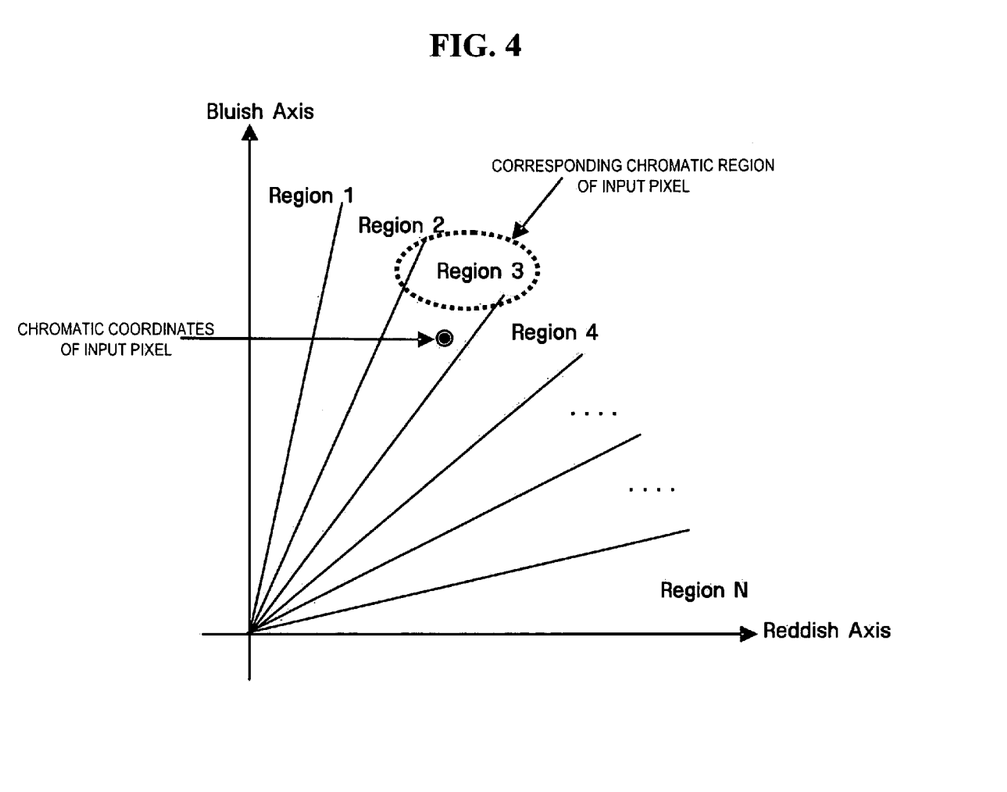
FIG. 4 is an exemplary view illustrating a chromatic region according to an exemplary embodiment of the present invention.

For example, referring to FIG. 4, a chromatic coordinate system having a reddish axis and a bluish axis is divided into N chromatic regions, and this information may be used as the chromatic region division information. In this case, how to divide the chromatic coordinate system may differ according to the characteristic of an image sensor mounted on an imaging apparatus such as a digital camera or a color correction form desired by a user.

Here, if the chromatic coordinates of the input pixel belong to "Region 3", the chromatic region of the input pixel becomes "Region 3".

If the chromatic region of the input pixel is determined, distances from the chromatic coordinates of the input pixel to neighboring chromatic regions are calculated S330, and a neighboring chromatic region located at the shortest distance from the chromatic region of the input pixel is determined S340.

Figure 5:
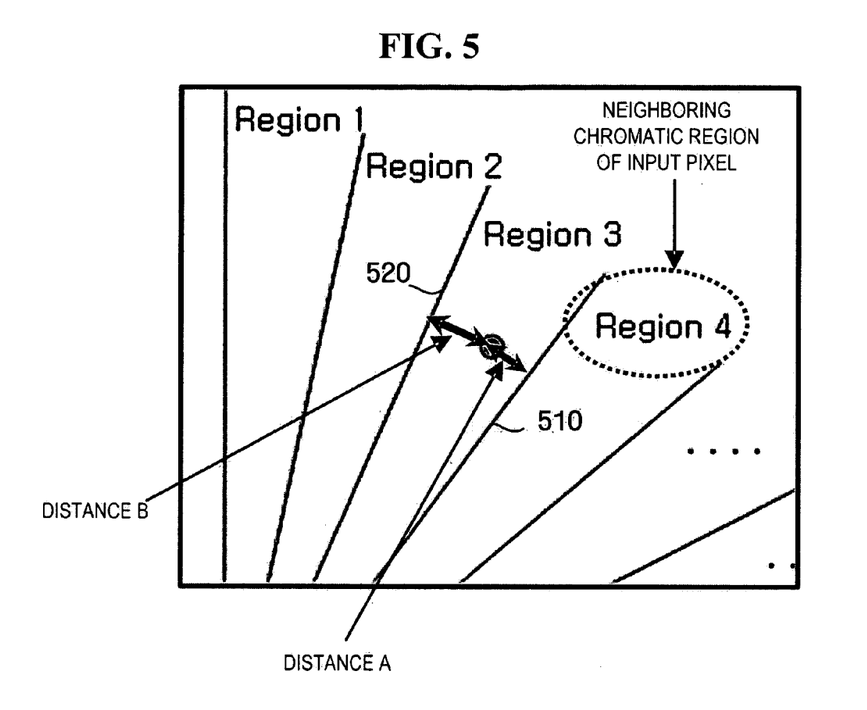
FIG. 5 is an exemplary view illustrating a neighboring chromatic region according to an exemplary embodiment of the present invention.

For example, referring to FIG. 5, if it is assumed that chromatic regions neighboring the chromatic coordinates of the input pixel are "Region 2" and "Region 4", a distance from the chromatic coordinates of the input pixel to a boundary line 510 between "Region 3" and "Region 4" is "DISTANCE A", and a distance from the chromatic coordinates of the input pixel to a boundary line 520 between "Region 2" and "Region 3" is "DISTANCE B", a chromatic region located at the shorter distance from the chromatic coordinates of the input pixel is determined as the neighboring chromatic region of the input pixel. In FIG. 5, "Region 4" is determined as the neighboring chromatic region because "DISTANCE A" is shorter than "DISTANCE B".

Figure 6:
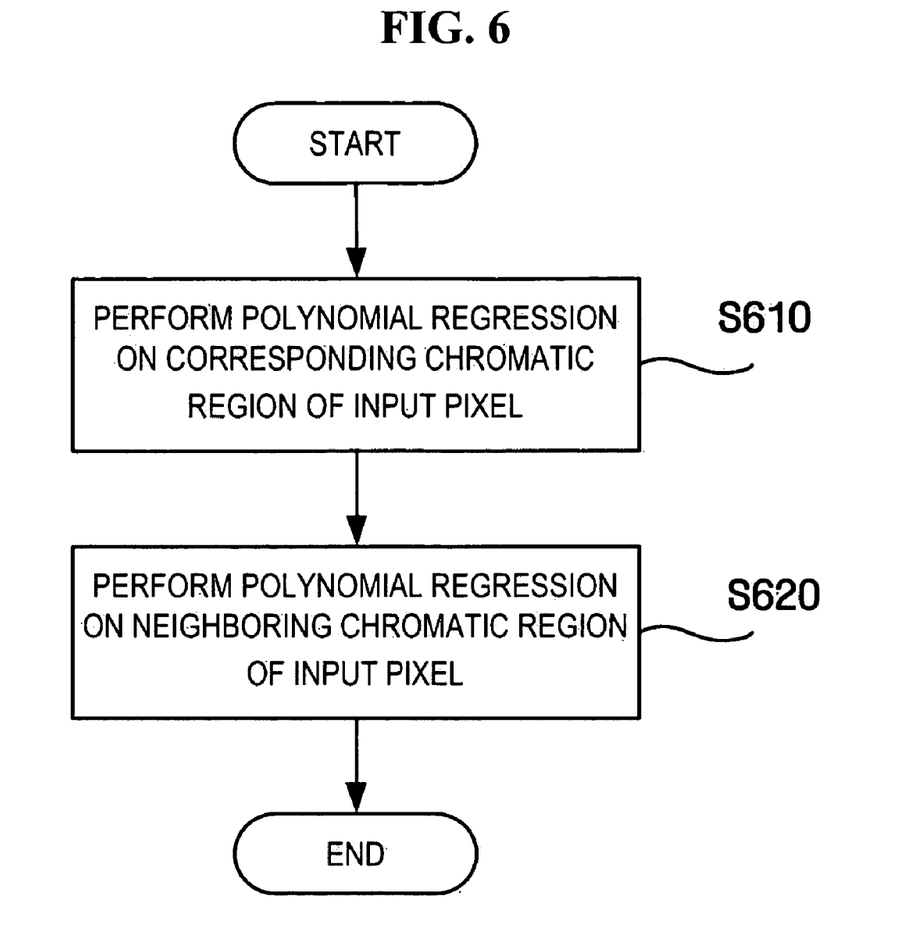
FIG. 6 is a flowchart illustrating a polynomial regression process according to an exemplary embodiment of the present invention.

FIG. 6 is a flowchart illustrating a polynomial regression process according to an exemplary embodiment of the present invention, in which operation S230 of FIG. 2 is illustrated in more detail.

According to the polynomial regression process of FIG. 6, a polynomial regression of the corresponding chromatic region of an input pixel is performed (S610).

Generally, if it is assumed that input pixel information refers to R, G, and B and target pixel information to correct R, G, and B refers to R', G', and B', a relation between R, G, and B and R', G', and B' in the corresponding chromatic region may be expressed as Equation (1).

$$R' = \alpha_{11}R + \alpha_{12}G + \alpha_{13}B$$

$$G' = \alpha_{21}R + \alpha_{22}G + \alpha_{23}B$$

$$B' = \alpha_{31}R + \alpha_{32}G + \alpha_{33}B \quad (1)$$

In this case, coefficients ($\alpha_{11}$, $\alpha_{12}$, $\alpha_{13}$, $\alpha_{21}$, $\alpha_{22}$, $\alpha_{23}$, $\alpha_{31}$, $\alpha_{32}$, $\alpha_{33}$) of R, G, and B, which refers to the input pixel information, are color corrected coefficients which correspond to information that represents correction characteristics of the corresponding chromatic region.

However, in the case of using the polynomial regression method according to the present invention, the target pixel information in the corresponding chromatic region of the input pixel may be expressed as Equation (2).

$$R' = \alpha_{11}R + \alpha_{12}G + \alpha_{13}B + \alpha_{14}R^2 + \alpha_{15}G^2 + \alpha_{16}B^2 + \alpha_{17}RG + \alpha_{18}RB + \alpha_{19}GB + \alpha_{110}RGB + \alpha_{111}$$

$$G' = \alpha_{21}R + \alpha_{22}G + \alpha_{23}B + \alpha_{24}R^2 + \alpha_{25}G^2 + \alpha_{26}B^2 + \alpha_{27}RG + \alpha_{28}RB + \alpha_{29}GB + \alpha_{210}RGB + \alpha_{211}$$

$$B' = \alpha_{31}R + \alpha_{32}G + \alpha_{33}B + \alpha_{34}R^2 + \alpha_{35}G^2 + \alpha_{36}B^2 + \alpha_{37}RG + \alpha_{38}RB + \alpha_{39}GB + \alpha_{310}RGB + \alpha_{311} \quad (2)$$

That is, in the present invention, the target pixel information of R', G', and B' is not represented by a linear combination of the input pixel information of R, G, and B as expressed in Equation (1), but by terms such as "$R^2$", "$G^2$", "$B^2$", "RG", "RB", "GB", "RGB" (hereinafter referred to as "crosstalk terms") and constants (i.e., $\alpha_{111}$, $\alpha_{211}$, and $\alpha_{311}$) that are added to the input pixel information as expressed in Equation (2). In this case, the coefficients for the input pixel information represent color correction characteristics of the corresponding chromatic region.

On the other hand, color errors resulting from the polynomial regression method according to the present invention and a conventional method as expressed in Equation (1) are comparatively described in Table 1.

TABLE 1

(Color Errors Resulting From Methods of the Present Invention and a Related Art Method)

| Number of Crosstalk Terms | Color Error | |
| --- | --- | --- |
| | Related Art Method | Present Invention |
| 3 | 4.33 | 2.68 |
| 4 | 4.31 | 2.74 |
| 7 | 3.49 | 1.88 |
| 11 | 1.80 | 1.03 |

As described in Table 1, by applying the polynomial regression method according to the present invention, the color error can be reduced by more than 35% in comparison to the related art method.

In the same manner, a polynomial regression of the neighboring chromatic region may be performed as Equation (2) (S620).

Figure 7:
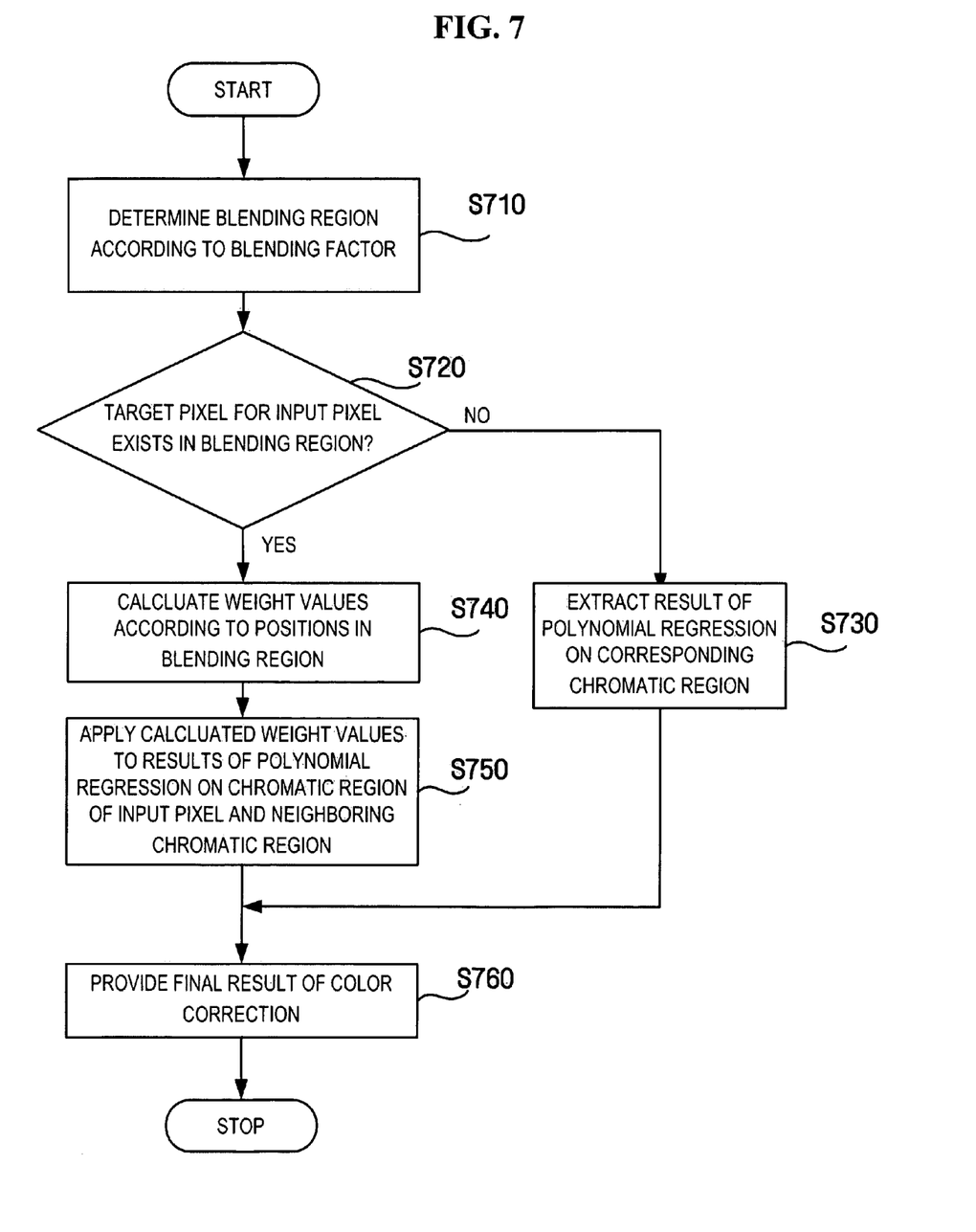
FIG. 7 is a flowchart illustrating a blending process according to an exemplary embodiment of the present invention.

FIG. 7 is a flowchart illustrating a blending process according to an exemplary embodiment of the present invention, in which operation S240 of FIG. 2 is illustrated in more detail.

According to the blending process of FIG. 7, a blending region is determined by a blending factor (S710). The blending region is a region to minimize the abrupt color change occurring around the boundary line of the chromatic region, which will now be explained in more detail with reference to FIGS. 8A to 8C.

Figure 8A:
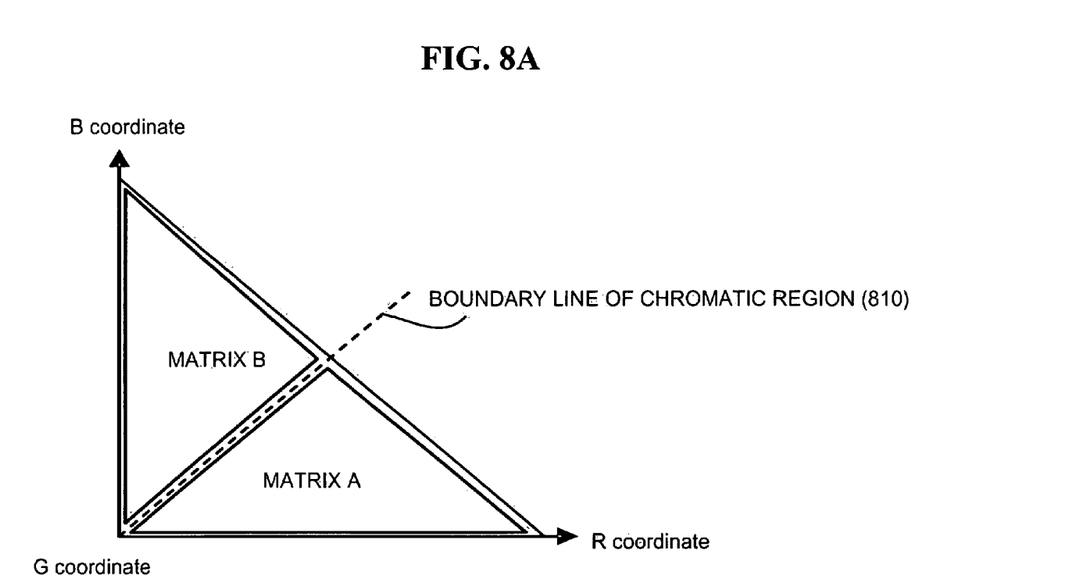
FIGS. 8A to 8C are exemplary views illustrating a method of determining a blending region according to an exemplary embodiment of the present invention.

Referring to FIG. 8A, a chromatic region of an input pixel and its neighboring chromatic region may be divided on the basis of a chromatic region boundary line 810. In this case, a matrix B means information that represents color correction characteristics of the chromatic region of the input pixel, and a matrix A means information that represents color correction characteristics of the neighboring chromatic region.

Figure 8B:
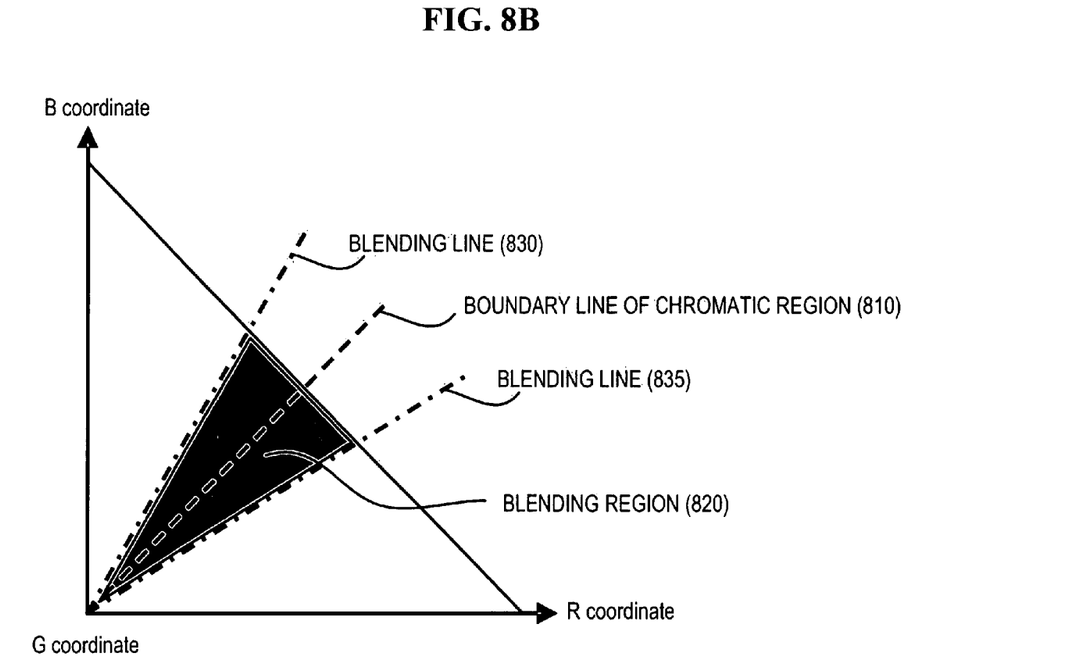
Figure 8C:
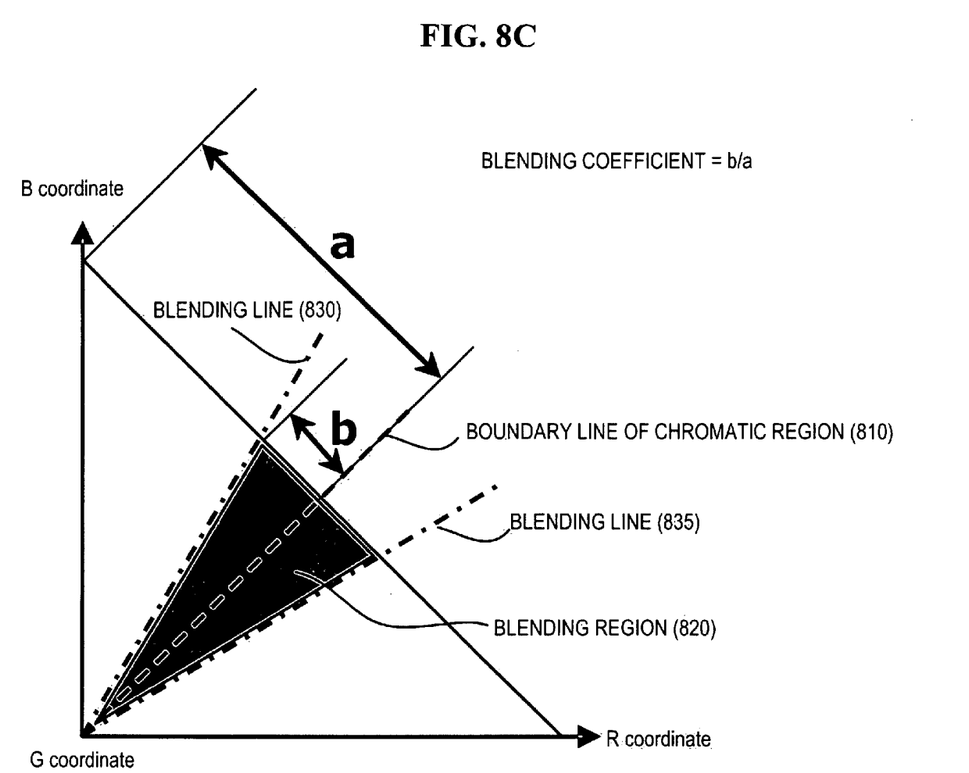

FIG. 8B illustrates a blending region 820 that is formed around the chromatic region boundary line 810, and FIG. 8C shows an example of a blending factor that forms the blending region.

Referring to FIG. 8C, the blending region is determined by a blending coefficient on the basis of the chromatic region boundary line 810. That is, the blending coefficient may be an example of the blending factor. In this case, the blending coefficient may be expressed by "b/a", where "a" denotes a distance from the chromatic region boundary line 810 to the other chromatic region boundary line of the corresponding chromatic region of the input pixel, and "b" denotes a distance from the chromatic region boundary line 810 to a blending line 830. If the blending coefficient is increased, the blending region 820 is widened, while if the blending coefficient is decreased, the blending region 820 is narrowed.

Although the blending region 820 is adjusted by adjusting the distance ratio (e.g., "b/a") in FIG. 8C, the ratio of the blending region to the corresponding chromatic region of the input pixel may be also used as the blending coefficient.

On the other hand, graphs illustrated in FIGS. 8A to 8C represent regularized forms of the RGB chromatic coordinates.

If the blending region is determined through operation S710, it is checked whether the input pixel exists in the determined blending region (S720).

If the input pixel does not exist in the determined blending region, the result of polynomial regression on the corresponding chromatic region is extracted (S730), and the extracted result is provided as the final result of color correction (S760). That is, the target pixel corresponding to the result of polynomial regression on the corresponding chromatic region of the input pixel is provided as the final result of color correction.

If the input pixel exists in the blending region in operation S720, a weight value is calculated on the basis of the position of the input pixel in the blending region (S740). Exemplary weight value calculations will now be explained in more detail with reference to FIG. 9.

Figure 9:
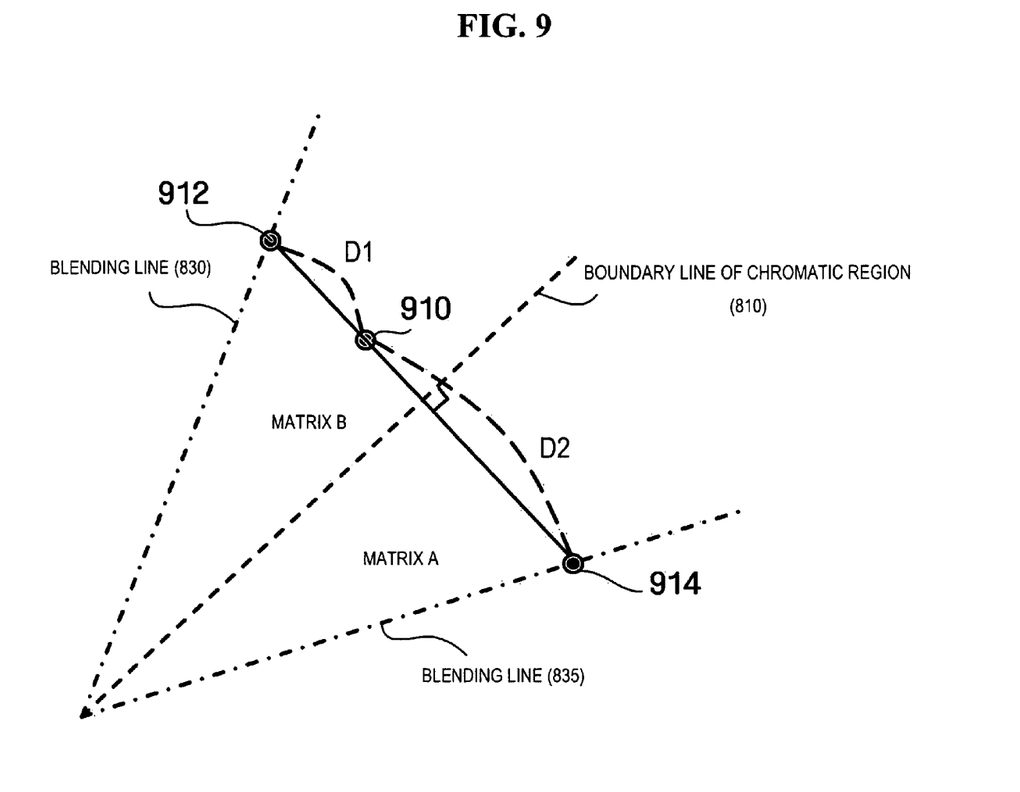
FIG. 9 is an exemplary view explaining extraction of a weighted average according to an exemplary embodiment of the present invention.

Referring to FIG. 9, it is assumed that a distance from an input pixel 910 to a blending line 835 of a neighboring chromatic region is denoted by "D2", a distance from the input pixel 910 to a blending line 830 of the corresponding chromatic region of the input pixel 910 is denoted by "D1", and "D1" and "D2" are called "chromatic distances".

In this case, the chromatic distances can be obtained on the basis of crosses 912 and 914 at which a line passing through the input pixel 910 and perpendicularly crossing the chromatic region boundary line 810 crosses the respective blending lines 830 and 835. In this case, the distance from the input pixel 910 to the first cross 912 and the distance from the input pixel 910 to the second cross 914 may be defined as "D1" and "D2", respectively.

As another example, the chromatic distances may be obtained on the basis of crosses at which lines passing through the input pixel 910 perpendicularly cross the blending lines 830 and 835, respectively.

In this case, the weight value of the input pixel 910 in the chromatic region can be obtained by calculating $$\frac{D2}{D1+D2}$$

using a weighted average, and the weight value of the input pixel in the neighboring chromatic region can be obtained by calculating $$\frac{D1}{D1+D2}$$

using the weighted average.

The weight values calculated in step S740 are applied to the results of polynomial regression of the corresponding chromatic region of the input pixel and the neighboring chromatic region as Equation (3) (S750).

$$Output = \frac{D1}{D1+D2} \times Matrix\ A \times Input + \frac{D2}{D1+D2} \times Matrix\ B \times Input \quad (3)$$

Here, Matrix B is a matrix that represents the color correction characteristics of the chromatic region of the input pixel, and Matrix A is a matrix that represents the color correction characteristics of the neighboring chromatic region. In addition, $$\frac{D2}{D1+D2}$$

represents a weight value for the chromatic region of the input pixel, and $$\frac{D1}{D1+D2}$$

represents a weight value for the neighboring chromatic region. The term "Input" represents input pixel information.

Last, the input pixel is corrected to "Output" value of Equation (3) and the "Output" value is provided as the final result of color correction S760.

Figure 10:
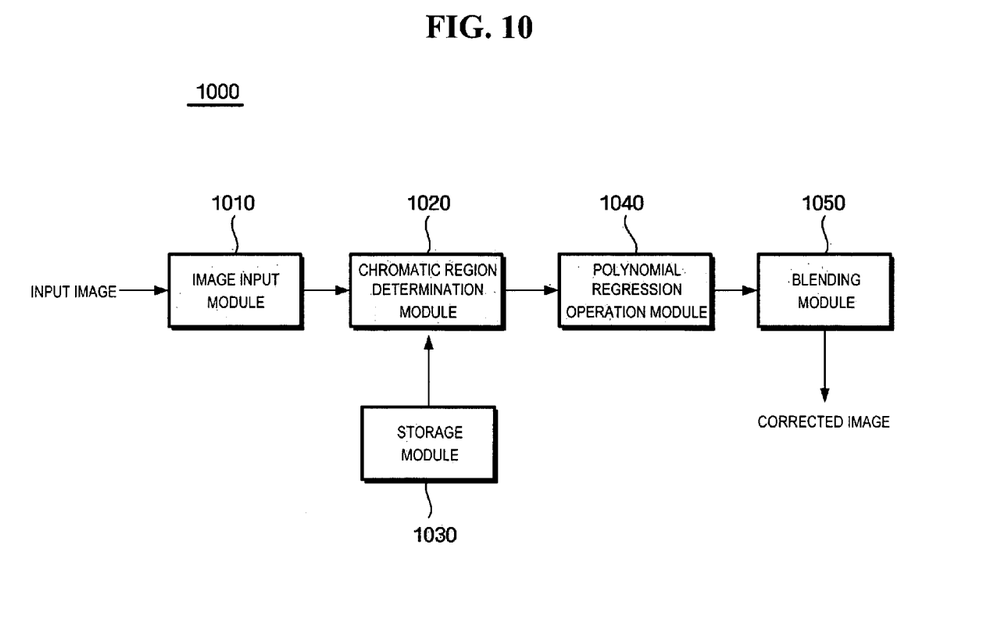
FIG. 10 is a block diagram illustrating the construction of a color correction apparatus according to an exemplary embodiment of the present invention.

FIG. 10 is a block diagram illustrating the construction of the color correction apparatus according to an exemplary embodiment of the present invention.

Referring to FIG. 10, the color correction apparatus 1000 according to the present invention includes an image input module 1010, a chromatic region determination module 1020, a storage module 1030, a polynomial regression operation module 1040, and a blending module 1050.

In the exemplary embodiments of the present invention, the term "module", as used herein, means, but is not limited to, a software or hardware component, such as a Field Programmable Gate Array (FPGA) or Application Specific Integrated Circuit (ASIC), that performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and/or variables. The functionality provided for in the modules may be combined into fewer modules or further separated into additional modules. In addition, the modules may be implemented so as to execute one or more CPUs in a device.

Referring to FIG. 10, if an object is photographed by the color correction apparatus 1000, an image is inputted to an image sensor (not shown) mounted on the color correction apparatus 1000, and respective pixel information constituting the input image is inputted. The input pixel information is converted into certain coordinates in a color space, and the converted coordinates are inputted to the image input module 1010.

The storage module 1030 stores the chromatic region division information as illustrated in FIG. 4, and the chromatic region determination module 1020 determines the first chromatic region to which an input pixel constituting an input image belongs and the second chromatic region neighboring the first chromatic region on the basis of the chromatic region division information. In this case, the second chromatic region means a chromatic region located at the shortest distance from the input pixel.

Then, the polynomial regression operation module 1040 performs a polynomial regression on the first chromatic region and the second chromatic region, and the blending module 1050 performs a blending process to obtain the finally corrected pixel information. In this case, the blending module 1050 determines a blending region by a blending factor, and calculates weight values according to the position of the input pixel in the blending region if the input pixel exists in the blending region.

Then, the calculated weight values are applied to the results of polynomial regression of the first chromatic region and the second chromatic region to provide the final corrected pixel information.

Figure 11A:
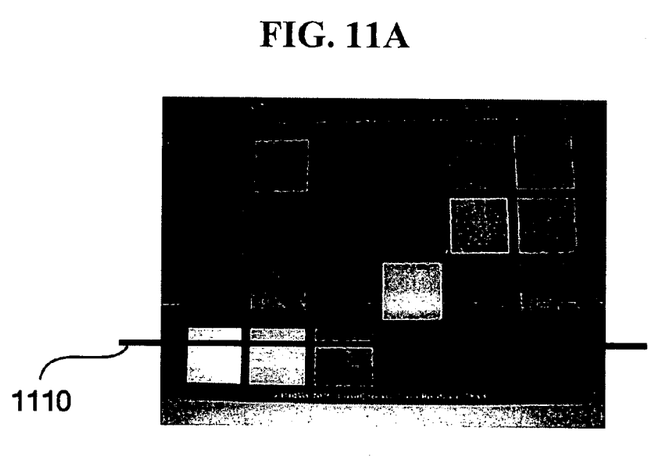
FIGS. 11A and 11B are views illustrating experimental results that represent the color correction performance according to an exemplary embodiment of the present invention.
Figure 11B:
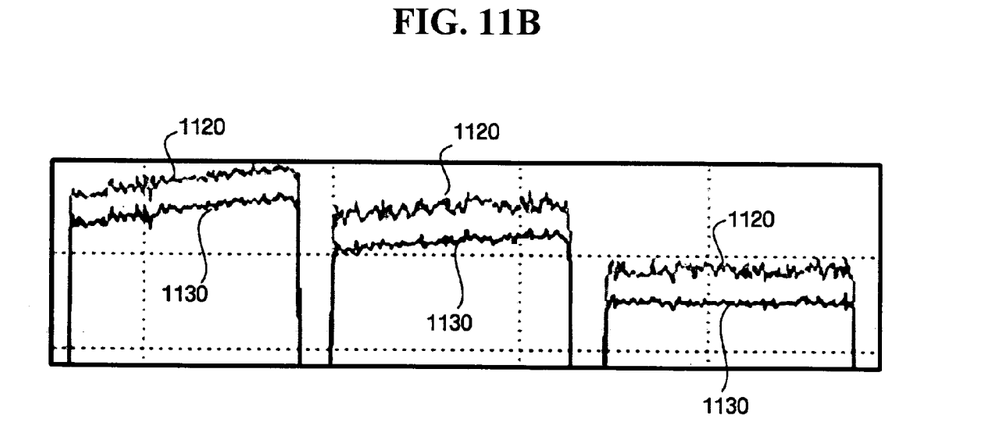

FIGS. 11A and 11B are views illustrating experimental results that represent the color correction performance according to an exemplary embodiment of the present invention.

FIG. 11A shows the forming of a boundary line 1110 with respect to a plurality of colors, and FIG. 11B shows a line profile formed by the boundary line 1110.

As can be seen from FIG. 11B, much flatter line profiles 1130 can be obtained by the color correction method according to the exemplary embodiments of the present invention, in comparison to line profiles 1120 obtained by the conventional color correction method.

As described above, according to the present invention, contour artifacts are minimized, and thus the color correction performance can be improved.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A color correction apparatus comprising:
    a chromatic region determination module which determines a first chromatic region to which an input pixel constituting an input image belongs and a second chromatic region neighboring the first chromatic region based on specified chromatic region division information;
    a polynomial regression operation module which performs polynomial regression on the first chromatic region and the second chromatic region; and
    a blending module which provides corrected pixel information for the input pixel by giving weight values to results of the polynomial regression on the first chromatic region and the second chromatic region.

2. The color correction apparatus of claim 1, wherein the second chromatic region comprises a chromatic region located at a shortest distance from the input pixel.

3. The color correction apparatus of claim 1, wherein the blending module:
    determines a specified blending region;
    calculates the weight values according to a position of the input pixel in the blending region, if the input pixel exists in the blending region; and
    applies the calculated weight values to the results of the polynomial regression to provide corrected pixel information for the input pixel.

4. The color correction apparatus of claim 3, wherein the blending region is determined by a blending factor.

5. The color correction apparatus of claim 4, wherein the blending factor is expressed by "b/a", in which "a" denotes a distance from a boundary line between the first chromatic region and the second chromatic region to the other boundary line of the first chromatic region, and
    wherein "b" denotes a distance from the boundary line between the first chromatic region and the second chromatic region to a boundary line of the blending region within the first chromatic region.

6. The color correction apparatus of claim 4, wherein the blending factor comprises a ratio of the blending region to the first chromatic region.

7. The color correction apparatus of claim 1, wherein the blending module:
    determines a specified blending region; and
    applies the results of the polynomial regression on the first chromatic region to the input pixel, if the input pixel does not exist in the blending region, to provide corrected pixel information for the input pixel.

8. The color correction apparatus of claim 1, wherein the weight values are determined on a basis of a first distance from the input pixel to a blending line of the first chromatic region and a second distance from the input pixel to a blending line of the second chromatic region.

9. The color correction apparatus of claim 8, wherein the first and second distances are measured perpendicular to a boundary line between the first and second chromatic regions.

10. The color correction apparatus of claim 8, wherein the first distance is measure perpendicular to the blending line of the first chromatic region, and
    wherein the second distance is measured perpendicular to the blending line of the second chromatic region.

11. The color correction apparatus of claim 1, further comprising:
    a storage module storing the chromatic region division information.

12. A color correction method comprising:
    using a chromatic region determination module for determining a first chromatic region to which an input pixel constituting an input image belongs and a second chromatic region neighboring the first chromatic region based on specified chromatic region division information;
    using a polynomial regression operation module for performing polynomial regression on the first chromatic region and the second chromatic region; and
    using a blending module for providing corrected pixel information for the input pixel by giving weight values to results of the polynomial regression on the first chromatic region and the second chromatic region.

13. The color correction method of claim 12, wherein the second chromatic region comprises a chromatic region located at a shortest distance from the input pixel.

14. The color correction method of claim 12, wherein providing the corrected pixel information comprises:
    determining a specified blending region;
    calculating the weight values according to a position of the input pixel in the blending region, if the input pixel exists in the blending region; and
    applying the calculated weight values to the results of the polynomial regression to provide corrected pixel information for the input pixel.

15. The color correction method of claim 14, wherein the blending region is determined by a blending factor.

16. The color correction method of claim 15, wherein the blending factor is expressed by "b/a", in which "a" denotes a distance from a boundary line between the first chromatic region and the second chromatic region to the other boundary line of the first chromatic region, and wherein "b" denotes a distance from the boundary line between the first chromatic region and the second chromatic region to a boundary line of the blending region within the first chromatic region.

17. The color correction method of claim 15, wherein the blending factor comprises a ratio of the blending region to the first chromatic region.

18. The color correction method of claim 12, wherein providing the corrected pixel information comprises:

applying the results of the polynomial regression on the first chromatic region to the input pixel after determining a specified blending region, if the input pixel does not exist in the blending region, to provide corrected pixel information for the input pixel.

19. The color correction method of claim 12, wherein the weight values are determined on a basis of a first distance from the input pixel to a blending line of the first chromatic region and a second distance from the input pixel to a blending line of the second chromatic region.

20. The color correction method of claim 19, wherein the first and second distances are measured perpendicular to a boundary line between the first and second chromatic regions.

21. The color correction method of claim 19, wherein the first distance is measured perpendicular to the blending line of the first chromatic region, and wherein the second distance is measured perpendicular to the blending line of the second chromatic region.

* * * * *